(12) United States Patent
Shaffer et al.

(10) Patent No.: US 7,630,487 B2
(45) Date of Patent: Dec. 8, 2009

(54) METHOD AND SYSTEM FOR DISTRIBUTING CALLS

(75) Inventors: Shmuel Shaffer, Palo Alto, CA (US); Mohammed I. Darwish, Sunnyvale, CA (US); Labhesh Patel, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 927 days.

(21) Appl. No.: 11/114,431

(22) Filed: Apr. 26, 2005

(65) Prior Publication Data

US 2006/0239442 A1 Oct. 26, 2006

(51) Int. Cl.
*H04M 3/00* (2006.01)

(52) U.S. Cl. .................... 379/266.03; 379/265.14; 379/266.04; 705/9

(58) Field of Classification Search ............ 379/214.01, 379/265.01–265.09, 265.1–266.1; 705/8, 705/9
See application file for complete search history.

(56) References Cited

U.S. PATENT DOCUMENTS

| 5,592,542 | A | * | 1/1997 | Honda et al. ............ 379/266.05 |
| 5,907,611 | A | * | 5/1999 | Dezonno et al. ......... 379/266.1 |
| 6,337,905 | B1 | | 1/2002 | Mizuta et al. .......... 379/265.02 |
| 6,493,695 | B1 | | 12/2002 | Pickering et al. ............. 706/47 |
| 6,512,825 | B1 | | 1/2003 | Lindholm et al. ...... 379/266.01 |
| 6,650,748 | B1 | | 11/2003 | Edwards et al. ........ 379/266.04 |
| 6,714,643 | B1 | | 3/2004 | Gargeya et al. ........ 379/266.06 |
| 6,845,155 | B2 | | 1/2005 | Elsey .................... 379/266.04 |

FOREIGN PATENT DOCUMENTS

| EP | 0 863 651 A2 | 9/1998 |
| EP | 0 863 651 A3 | 4/1999 |
| EP | 1 011 256 A2 | 6/2000 |
| EP | 1 091 307 A2 | 4/2001 |
| EP | 1 091 307 A3 | 8/2001 |
| EP | 1 011 256 A3 | 8/2003 |

OTHER PUBLICATIONS

"Avaya Tenovis; Call Center; Features & Benefits," Avaya Menus, http://www.avaya.fr/Produits/Call_Center/feature%20benefits/features_benefits.asp?print=yes, 2 pages, 2003.
PCT, International Search Report and Written Opinion (ISA/EPO)dated Aug. 16, 2006 for PCT/US2006/013759, 12 pages.

* cited by examiner

*Primary Examiner*—Simon Sing
*Assistant Examiner*—Assad Mohammed
(74) *Attorney, Agent, or Firm*—Baker Botts L.L.P.

(57) ABSTRACT

A method for distributing calls includes receiving a plurality of calls each for connection with one of a plurality of agents and storing each of the plurality of calls in a queue. The method includes monitoring the time that each of the plurality of calls has spent in the queue and determining that a first agent is available to receive a call. The method also includes determining, for a first call that has spent the most time in the queue, a first amount of time that the first call has spent in the queue and determining whether the first amount of time has exceeded a service level time. The method includes, if the first amount of time has not exceeded the service level time, distributing the first call to the first agent.

16 Claims, 3 Drawing Sheets

METHOD AND SYSTEM FOR DISTRIBUTING CALLS

TECHNICAL FIELD OF THE INVENTION

This invention relates in general to communication systems and, more particularly, to a method and system for distributing calls.

BACKGROUND OF THE INVENTION

Automatic call distributors (ACDs) and other contact or call centers typically include specialized systems designed to match incoming requests for service, for example a telephone call or an e-mail, with a resource that is able to provide that service, for example a human call center agent. ACDs generally perform one or more of the following functions: (i) recognize and answer incoming calls; (ii) review database(s) for instructions on what to do with a particular call; (iii) using these instructions, identify an appropriate agent and queue the call, often times providing a prerecorded message; and (iv) connect the call to an agent as soon as the agent is available.

Hosted ACD call centers enable customers to focus on their core business while reducing capital expenditure and freeing them from the hassle of managing call center resources (e.g., agents and equipment). Such hosted centers may provide equipment, agents and supervisors to handle incoming calls on behalf of customers (clients). As part of the contract between the hosted ACD service provider and their clients, a service level agreement (SLA) may be negotiated. One key aspect of the SLA is meeting predetermined service level goals (SLGs) or targets such as answering a specified percent of incoming calls are within a predetermined time (e.g., 80% of incoming calls must be answered within 20 seconds). The hosted ACD service provider may be paid in accordance with its ability to meet the agreed upon SLA.

Hosted ACD software typically handles incoming calls in a linear first in first out (FIFO) algorithm. More sophisticated systems may provide priority queues for more important customers; but again within each queue, callers are serviced in accordance with the linear FIFO algorithm.

Some systems, such as those from Avaya, aim to improve the service level (SL) by dynamically moving agents between queues. To achieve this functionality, these systems continuously calculate the SL for each queue. If they find that a certain queue is able to meet its target SLA while another queue is falling behind, the system automatically moves agents from the queue that meets the SL to the queue that is falling behind.

SUMMARY OF THE INVENTION

The present invention provides a method and system for distributing calls that substantially eliminates or reduces at least some of the disadvantages and problems associated with previous methods and systems.

In accordance with a particular embodiment, a method for distributing calls includes receiving a plurality of calls each for connection with one of a plurality of agents and storing each of the plurality of calls in a queue. The method includes monitoring the time that each of the plurality of calls has spent in the queue and determining that a first agent is available to receive a call. The method also includes determining, for a first call that has spent the most time in the queue, a first amount of time that the first call has spent in the queue and determining whether the first amount of time has exceeded a service level time. The method includes, if the first amount of time has not exceeded the service level time, distributing the first call to the first agent.

In accordance with another embodiment, a method for distributing calls includes receiving a plurality of calls each for connection with one of a plurality of agents and storing each of the plurality of calls in a queue. The method includes monitoring the time that each of the plurality of calls has spent in the queue and determining that a first agent is available to receive a call. The method also includes selecting, for distribution to the first agent, a call out of the plurality of calls in the queue. The selected call comprises a call other than a call that has spent the most time in the queue out of the plurality of calls in the queue. The method includes distributing the selected call to the first agent. Selecting, for distribution to the first agent, a call out of the plurality of calls in the queue may comprise selecting, for distribution to the first agent, a call out of the plurality of calls in the queue based on a service level goal.

Technical advantages of particular embodiments include systems and methods that provide call distribution in a non-sequential manner to increase service level performance. Thus, calls waiting in queue may be skipped for immediate distribution and doing so may improve service level performance. In some embodiments, the number of times calls may be skipped and/or the amount of time calls may wait in queue may be limited. Providing non-sequential distribution of queue calls may improve efficiency of call centers by allowing them to maintain certain levels of performance without having to shoulder increased expenses.

Other technical advantages will be readily apparent to one skilled in the art from the following figures, descriptions and claims. Moreover, while specific advantages have been enumerated above, various embodiments may include all, some or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

Figure 1:
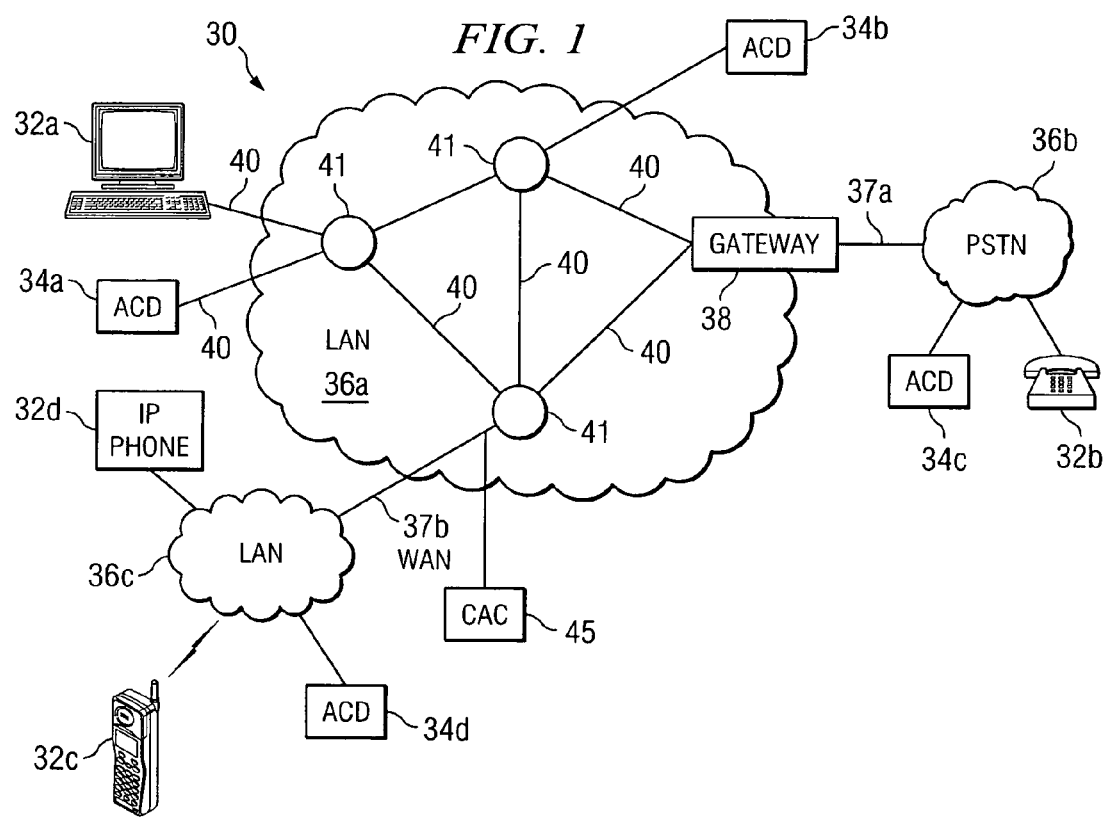
FIG. 1 illustrates a communication system including a plurality of endpoints operable to communicate among each other and a plurality of automatic call distributors, in accordance with a particular embodiment of the present invention.

FIG. 1 illustrates a communication system 30 including a plurality of endpoints 32a-32d having the ability to establish communication sessions between each other and/or automatic call distributors (ACDs) 34a-34d, using one or more of communication networks 36a-36c. ACDs are specialized communication systems designed to route incoming calls to available agents, so that calls are properly and/or evenly distributed. For the purposes of this specification, "automatic call distributor" or "ACD" shall refer to any combination of hardware, software and/or embedded logic which is operable to automatically distribute incoming calls. ACDs may comprise hosted or non-hosted call centers. "Calls" shall include requests for service transmitted using any audio and/or video means, including signals, data or messages transmitted through voice devices, text chat, web sessions, facsimile, instant messaging and e-mail. ACDs may include outsourced call centers or other contact centers that receive incoming customer calls for distribution to agents and that may place calls from agents to customers.

In particular embodiments, ACDs distribute queued calls to agents in a non-sequential manner to the order that the calls were received to increase service level performance. Thus, calls waiting the longest time in queue may be skipped for immediate distribution and doing so may improve service level performance. In some embodiments, the number of times calls may be skipped and/or the amount of time calls may wait in queue may be limited. Providing non-sequential distribution of queue calls may improve efficiency of call centers by allowing them to maintain certain levels of performance without having to shoulder increased expenses.

In the illustrated embodiment, communication network 36a is a local area network (LAN) that enables communication between a plurality of endpoints 32a-32d and ACDs 34a-34d distributed across multiple cities and geographic regions. In another embodiment, a single, central ACD may be used, which distributes incoming calls to agents distributed across multiple cities and geographic regions. Communication network 36b is a public switched telephone network (PSTN) and couples endpoint 32b and ACD 34c with communication network 36a through gateway 38. Communication network 36c is another LAN, which couples endpoints 32c and 32d and ACD 34d with communication network 36a. Accordingly, users of endpoints 32a-32d and automatic call distributors 34a-34d can establish communication sessions between and among each network component coupled for communication with one or more of networks 36a-36c. Communication links 37a and 37b couple communication networks 36a and 36b, and communication networks 36a and 36c, respectively. In the illustrated embodiment, communication link 37b is a wide area network (WAN), which couples LANs 36a and 36c. A call admission control (CAC) system 45 may be used to monitor and police the bandwidth available over WAN 37b.

Communication network 36a includes a plurality of segments 40 and nodes 41 that couple endpoint 32a with ACDs 34a and 34b, gateway 38 and communication networks 36b-36c. Therefore, a user of endpoint 32a is provided with access to endpoints 32b-32d, and automatic call distributors 34a-34d. Nodes 41 may include any combination of network components, gatekeepers, call managers, conference bridges, routers, hubs, switches, gateways, endpoints, or other hardware, software, or embedded logic implementing any number of communication protocols that allow for the exchange of packets in communication system 30.

Although the illustrated embodiment includes three communication networks 36a-36c, the term "communication network" should be interpreted as generally defining any network capable of transmitting audio and/or video telecommunication signals, data, and/or messages, including signals, data or messages transmitted through text chat, instant messaging and e-mail. Any one of networks 36a-36c may be implemented as a local area network (LAN), wide area network (WAN), global distributed network such as the Internet, Intranet, Extranet, or any other form of wireless or wireline communication network. Generally, network 36a provides for the communication of packets, cells, frames, or other portions of information (generally referred to as packets herein) between endpoints 32a-32d. Communication network 36a may include any number and combination of segments 40, nodes 41, endpoints 32a-32d, and/or ACDs 34a-34d.

In a particular embodiment, communication network 36a employs voice communication protocols that allow for the addressing or identification of endpoints, nodes, and/or ACDs coupled to communication network 36a. For example, using Internet protocol (IP), each of the components coupled together by communication network 36a in communication system 30 may be identified using IP addresses. In this manner, network 36a may support any form and/or combination of point-to-point, multicast, unicast, or other techniques for exchanging media packets among components in communication system 30. Any network components capable of exchanging audio, video, or other data using frames or packet, are included within the scope of the present invention.

Network 36a may be directly coupled to other IP networks including, but not limited to, another LAN or the Internet. Since IP networks share a common method of transmitting data, telecommunication signals may be transmitted between telephony devices located on different, but interconnected, IP networks. In addition to being coupled to other IP networks, communication network 36a may also be coupled to non-IP telecommunication networks through the use of interfaces or components, for example gateway 38. In the illustrated embodiment, communication network 36a is coupled with PSTN 36b through gateway 38. PSTN 36b includes switching stations, central offices, mobile telephone switching offices, pager switching offices, remote terminals, and other related telecommunications equipment that are located throughout the world. IP networks transmit data (including voice and video data) by placing the data in packets and sending each packet individually to the selected destination, along one or more communication paths. Unlike a circuit-switched network (like PSTN 36b), a dedicated circuit is not required for the duration of a call or fax transmission over IP networks.

Technology that allows telecommunications to be transmitted over an IP network may comprise Voice over IP (VoIP), or simply Voice over Packet (VoP). In the illustrated embodiment, endpoint 32d, ACDs 34a-34b, and gateway 38 are IP telephony devices capable of participating in IM, video, and other multimedia communication sessions. IP telephony devices have the ability of encapsulating a user's voice (or other input) into IP packets so that the voice can be transmitted over network 36a. IP telephony devices may include telephones, fax machines, computers running telephony software, nodes, gateways, wired or wireless devices, hand held PDA, or any other device capable of performing telephony functions over an IP network.

In particular embodiments, communication system 30 may receive and transmit data in a session initiation protocol (SIP) environment. SIP is an application-layer control protocol that includes primitives for establishing, modifying and terminating communication sessions. SIP works independently of underlying transport protocols and without dependency on the type of session that is being established. SIP also transparently supports name mapping and redirection services, which support personal mobility.

It will be recognized by those of ordinary skill in the art that endpoints 32a-32d, ACDs 34a-34d and/or gateway 38 may be any combination of hardware, software, and/or encoded logic that provides communication services to a user. For example, endpoints 32a-32d may include a telephone, a computer running telephony software, a video monitor, a camera, an IP phone, a cell phone or any other communication hardware, software and/or encoded logic that supports the communication of packets of media (or frames) using communication network 36a. Endpoints 32a-32d may also include unattended or automated systems, gateways, other intermediate components or other devices that can establish media sessions. Although FIG. 1 illustrates a particular number and configuration of endpoints, ACDs, segments, nodes, and gateways, communication system 30 contemplates any number or arrangement of such components for communicating media.

Figure 2:
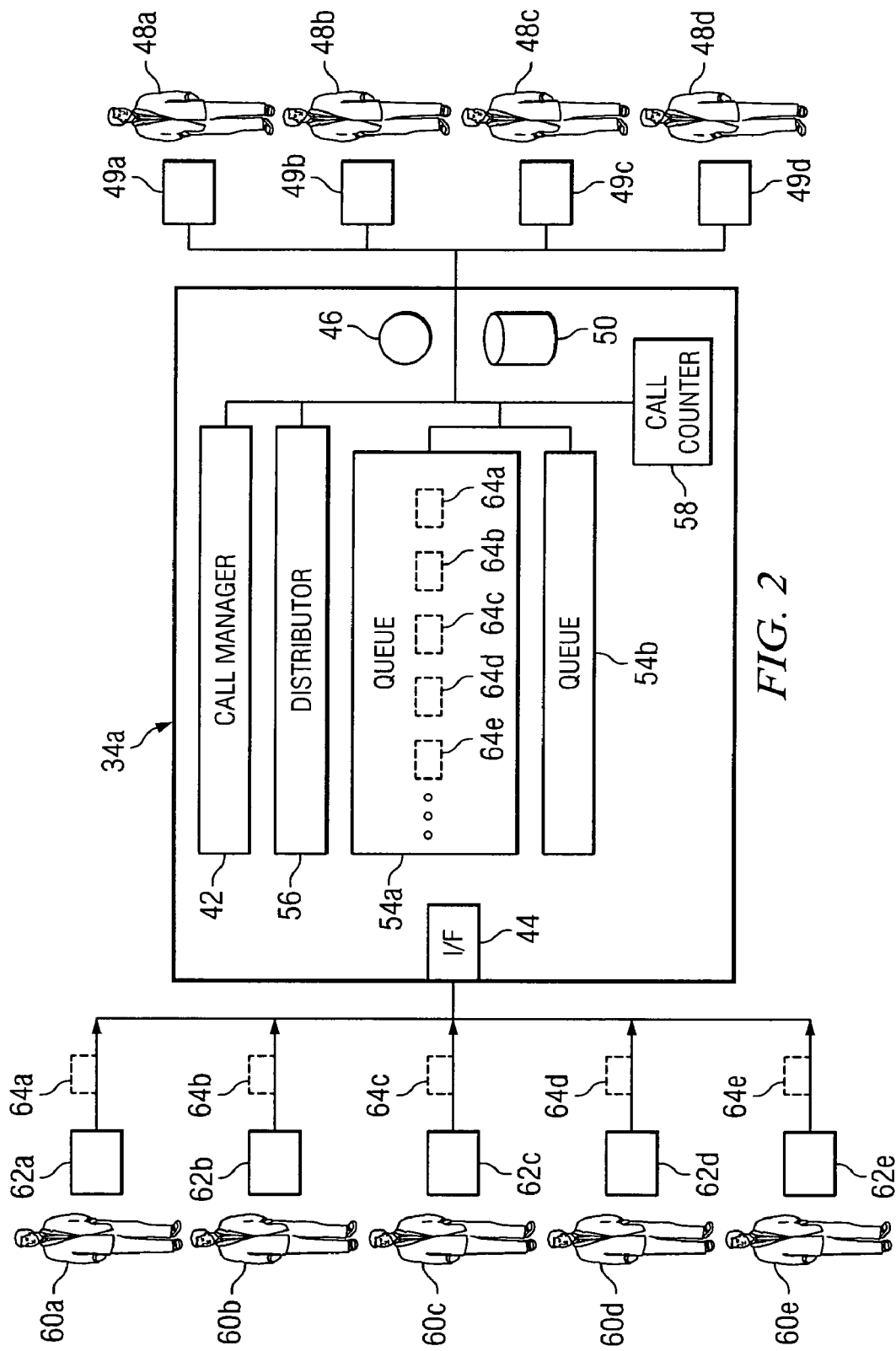
FIG. 2 illustrates an automatic call distributor of FIG. 1 in more detail, illustrating aspects of the present invention.

FIG. 2 illustrates ACD 34a in more detail, in accordance with a particular embodiment of the present invention. In the illustrated embodiment, ACD 34a includes a call manager 42, an interface or input ports 44, a processor 46, memory module 50, queues 54, a distributor 56 and a call counter 58. Interface or input ports 44 couple ACD 34a with communication network 36a. Processor 46 may be a microprocessor, controller, or any other suitable computing device, resource, or combination of hardware, software and/or encoded logic. Processor 46 may work in conjunction with other components of ACD 34a to provide functionality of ACD 34a discussed herein. Memory module 50 may be any form of volatile or non-volatile memory including, without limitation, magnetic media, optical media, random access memory (RAM), read-only memory (ROM), removable media, or any other suitable local or remote memory component. Memory module 50 may store any suitable information necessary to accomplish the ACD functionality described herein.

The illustrated embodiment includes agents 48 associated with ACD 34a. It should be understood that ACDs in accordance with various embodiments may be associated with any suitable number of agents 48. The illustrated embodiment also includes callers 60. Agents 48 use respective endpoints 49 to communicate with callers to ACD 34a, and callers 60 use endpoints 62 to communicate with agents 48 associated with ACD 34a. Endpoints 49 and 62 may be similar to one or more of the endpoints described above with respect to FIG. 1, such as IP phone endpoint 32d. It should be understood that endpoints 49 and 62 may be coupled to ACD 34a through one or more communication networks, such as the communication networks described above with respect to FIG. 1 which may include one or more WANs or LANs as indicated above.

Call manager 42 maintains information on all agents and other users of system 30 and facilitates communication among users. Call manager 42 may be any combination of hardware, software, and/or encoded logic and is used by ACD 34a to manage agents 48 and other users of system 30. In particular embodiments, call manager 42 may maintain a listing, table, or other organization of information about agents 48 and other users of system 30. The information may include a name or other identifier for each agent 48 and other user. The information may also include contact information such as phone numbers and email addresses for the agents 48 and users. For identifying agents 48a-48d that may be contacted or otherwise recruited to handle incoming calls received by the ACD 34a, call manager 42 may also include information identifying whether a user of system 30 is a call agent or performs other tasks within the organization. As is the case with other components of ACD 34a, in particular embodiments the functionality of call manager 42 may be performed by hardware, software or encoded logic distributed throughout a communication network coupled with the ACD.

When an incoming call is received through interface 44, processor 46 determines if a suitable agent 48 is available to receive an incoming call. If a suitable agent is available to receive the incoming call, distributor 56 distributes the call to such agent for handling. For example, distributor 56 may connect a voice or video call with the available suitable agent. If a suitable agent is not available, the call may be placed into a queue 54 in order to wait for an appropriate agent(s). In this embodiment, ACD 34a has two queues 54; however other embodiments of the present invention may have none, one or more than two queues 54. The selection of which queue 54 to place an incoming call may depend on the type of customer making the call, the type of service requested in the call or any other characteristic or condition relating to the call or to ACD 34a. While a customer is waiting for an agent, ACD 34a may perform one or more of several functions including data collection from the user, playing of pre-recorded messages, or other automated process. As soon as a suitable agent becomes available, distributor 56 distributes the call to the appropriate agent.

Call counter 58 comprises any suitable software, hardware or encoded logic that keeps track, for example in connection with processor 46, of information associated with calls 64. This information may include, for example, call wait time, number of times a call has been skipped for distribution (as discussed below), call center wait time limits, projected abandon times, tolerance times and projected agent availability times.

As indicated above, in many situations multiple calls may be placed in a queue 54 awaiting connection with an agent. Particular embodiments employ various methods in order to determine an order in which calls placed in queues are distributed to agents that become available to handle the calls. Such methods may be implemented to meet one or more service level goals or commitments of a call center.

As an example, assume that a particular service level (SL) for ACD 34a is measured by the percentage of calls that are connected with an agent within twenty seconds. In a specific instance, assume that there are five calls 64a-64e in queue 54a, each call from one of callers 60a-60e. Calls 64a-64e have already spent 21, 19, 18, 15 and 10 seconds, respectfully, in the ACD queue. In addition, assume that there are five agents 48a-48e who are currently servicing previous calls and that they are about to complete handling of their current calls in 1, 2, 3, 4 and 5 seconds, respectively. If ACD 34a followed a first in first out (FIFO) algorithm, calls 64a-64e would be answered after spending 22, 21, 21, 19 and 15 seconds, respectively, in queue 54a. Thus, for this small sample, the call center would answer two out of five calls within the twenty second SL interval resulting in a SL of forty percent which is an unacceptable performance.

In particular embodiments, ACD 34a can distribute calls 64 for connection with agents 48 using a non-FIFO method. As an example, calls 64 in queue 54a may be distributed in the following order: second call 64b, third call 64c, first call 64a, fourth call 64d and fifth call 64e. This would result in the calls being answered within 20, 20, 24, 19, 15 seconds, respectively. Thus, for this small sample the call center would answer four out five calls within the twenty second SL interval, resulting in a SL of eighty percent, which may be an acceptable performance. In this example, although call 64a, which entered into queue 54a first, would spend an additional two seconds in queue, the overall performance of the ACD as measured by the SL would improve. The improved SL from forty percent to eighty percent would be achieved without increasing the average queue time of all calls in queue.

Embodiments may use various different computation methods to determine the order in which calls 64 waiting in a queue 54 may be distributed to and answered by agents 48. In particular embodiments, ACD 34a, for example through processor 46, continuously monitors the amount of time each call has spent in a queue 54 and the prospective time that it would take agents to free up to handle each call in the queue. As an agent frees up (agent 48a in this example), rather than simply distributing to the agent the next call 64 from the queue, ACD 34a, for example through processor 46, may first check if the call 64 at the end of the queue (i.e., the call 64 that has currently spent the most time waiting in the queue—call 64a in the illustrated embodiment) has exceeded the SL time goal (e.g., twenty seconds in some cases). If the call has not exceeded the SL time goal, call 64a is transferred to agent 48a who has freed up.

If call 64a at the end of the queue has, however, exceeded the SL time, the system may skip the call for now and go to the next call. In some cases the system may determine whether the wait time for the call has reached a "tolerance before abandon" time. The "tolerance before abandon" time may be a system wide, per queue or per call configurable parameter that indicates a tolerance time range before a call waiting in a queue may be abandoned by, for example, the system or the caller. For example, this tolerance time range may comprise twenty seconds before projected abandonment. Distributing a call that has passed the SL time but has reached a "tolerance before abandon time" may ensure, for customer satisfaction purposes, that particular calls that have already waited in queue for some time, exceeding a SL time, will be distributed to an agent before being abandoned by the call center. Thus, if a call 64 at the end of a queue has reached the "tolerance before abandon" time limit and an agent becomes free for a connection, the call 64 may be automatically distributed to the free agent. Some embodiments may not implement the use of a "tolerance before abandon" time limit as a parameter to limit the amount of time that any call may spend in queue. In some cases, a tolerance before abandon time for a particular call may change based on the identity of a caller, the caller's business association or employment status or other characteristic. Thus, the amount of time calls from more important callers may be wait in queue may be limited in particular embodiments.

Continuing the above example, if call 64a has not reached a "tolerance before abandon" time, the system assesses if the second or next call 64 in the queue (i.e., the call 64 that has currently spent the second-most time waiting in the queue—call 64b in the illustrated embodiment) should be distributed to an agent before the first call in the queue, call 64a. For example, in some systems ACD 34a may undertake for call 64b the same steps take above with respect to call 64a—namely, determining whether the wait time for call 64b has exceeded the SL time. If the wait time for call 64b has not exceeded the SL time, call 64b may be connected to agent 48a. If, however, the wait time for call 64b has exceeded the SL time, ACD 34a may then undertake the "tolerance before abandon" time determination or may simply proceed to the next call 64 in the queue.

In other systems, for determining whether call 64b should be distributed to an agent (e.g., agent 48a) before call 64a, ACD 34a may determine whether the next agent most likely to be available (e.g., agent 48b in this example) is likely to free up in time to handle call 64b before call 64b exceeds the SL time. If agent 48b is likely to free up in time to handle call 64b before call 64b exceeds the SL time, then the system may either automatically distribute call 64a to the available agent 48a or may undertake for the next call in the queue (e.g., call 64c) this same process that has been undertaken for call 64b. If agent 48b is not likely to free up in time to handle call 64b before call 64b exceeds the SL time, then the system may then distribute call 64b to available agent 48a. The determination or projection of an amount of time in which a next agent will likely become available and whether the next agent is likely to be available to receive a certain call within a certain time frame may be made using any suitable call traffic methods or algorithms. Various parameters may be taken into account, such as average call handling time, type of call being handled, agent history and feedback from agents currently handling calls (e.g., feedback comprising an agent's on projection while on a call of his ability to complete handling of the call in a certain amount of time or his estimate as to length of time to complete handling of the call).

It should be understood that the various methods for determining a non-FIFO order for call distribution, such as those discussed herein, may be undertaken in an iterative process for each successive call waiting in a queue and, for example, as agents 48 become available to receive additional calls.

When a call 64 is skipped in the distribution process (for example, as call 64a is first skipped above because its wait time has exceeded the SL time), the ACD tracks this event in call counter 58. In some embodiments, ACD 34a may be set to allow calls, such as first call 64a) to be skipped up to a particular number of times (e.g., two times). In some cases, the number of times a call may be skipped may change based on the identity of a caller, the caller's business association or employment status or other characteristic. Thus, the number of times calls from more important callers may be skipped may be limited or may be set to zero skips in particular embodiments. In accordance with some embodiments, ACD 34a may skip the first call 64a in queue 54a only if the call had missed the SL answer time by no more than a particular amount of time (e.g., three seconds) constituting a time limit over the SL time. Particular embodiments may employ both a skip limit and a time limit above the SL time (no more than N skips and no more than x seconds of wait time over the missed SL time) in the decision of whether to answer a particular call in the queue.

In some embodiments, ACD 34a may skip more than one call 64 in the top of the ACD queue. The maximum number of calls 64 at the top of the queue that may be skipped may be a configurable parameter as part of the call center configuration. In some cases, ACD 34a may always check if the "tolerance before abandon" time or another time limit passed the SL time is reached by a call 64 in queue before applying algorithms discussed. Parameters discussed herein, such as skip limits and limits or restraints on call wait times, may be set and altered by one associated with a business or entity using a hosted ACD resources, by an ACD administrator or by any other suitable person according to particular goals and needs.

It will be recognized by those of ordinary skill in the art that ACD 34a is merely one example configuration of an ACD for handling calls in accordance with particular embodiments. ACD 34a may include any number of interfaces, call managers, processors, memory modules, distributors, queues and call counters to accomplish the functionality and features described herein. For example, although ACD 34a is illustrated and described as including call manager 42, interface 44, processor 46, memory module 50, two queues 54, distributor 56 and call counter 58, these components and other desired components for performing the above described functionality may be centrally located (local) with respect to one another, or distributed throughout communication system 30. In addition, one or more components of ACD 34a may work together in performing various functionality described herein. For example, distributor 56 and processor 46 may work together to distribute calls to agents.

Figure 3:
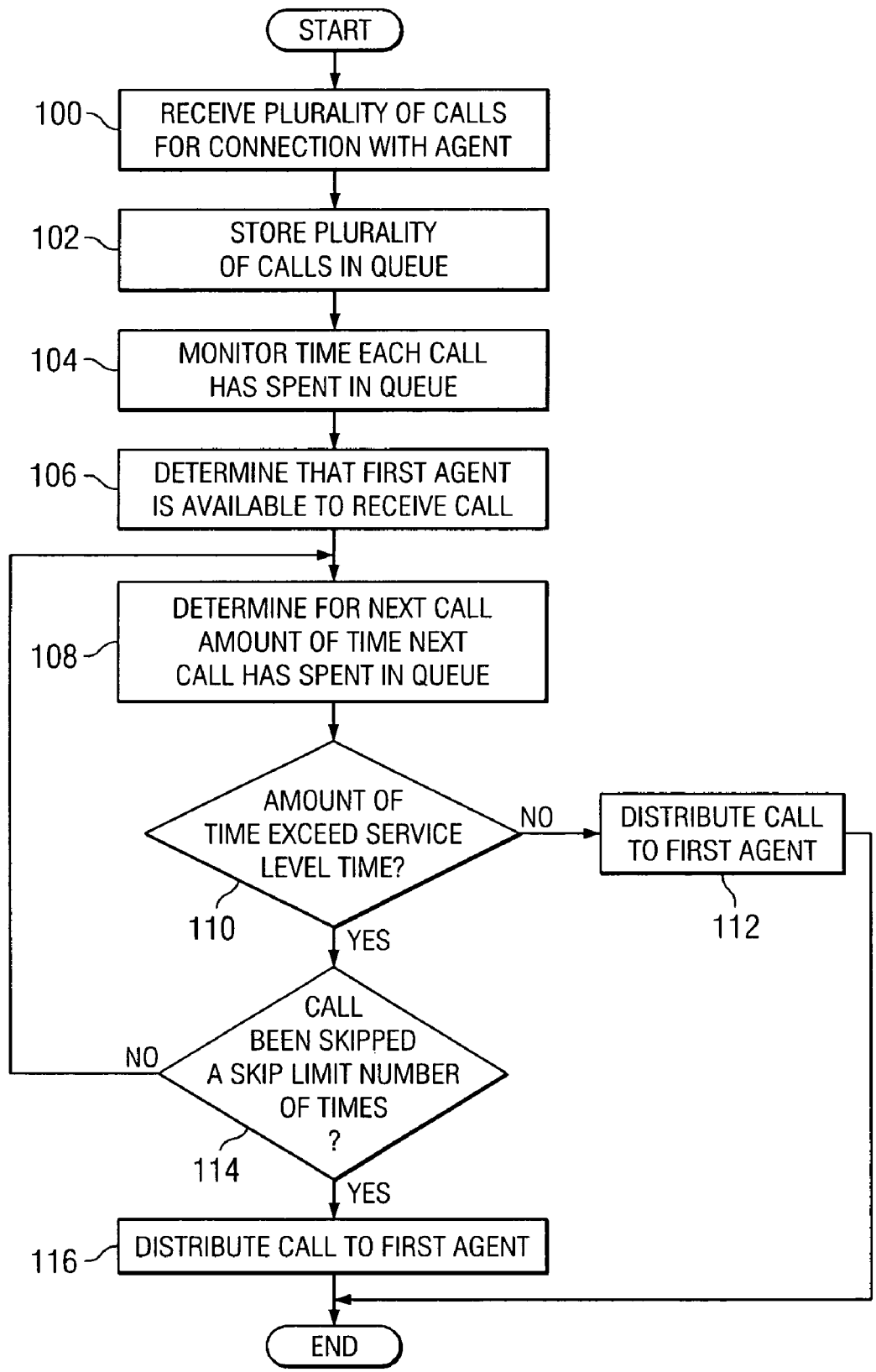
FIG. 3 illustrates a method for distributing calls, in accordance with an embodiment of the present invention.

FIG. 3 is a flowchart illustrating a method for distributing calls, in accordance with a particular embodiment. The method begins at step 100 where a plurality of calls are received each for connection with one of a plurality of agents. The calls may be received at separate times. At step 102, the plurality of calls are stored in a queue to wait for available agents to receive the calls. At step 104, the time that each call has spent waiting in the queue is monitored. At step 106, it is determined that a first agent has become available to receive a call. For example, the first agent may have freed up after handling another call or may have just been assigned duty to receive calls.

At step 108, the amount of time that the next call in the queue has spent in the queue is determined. For example, the next call in the queue may be the call that has, at the time, spent the most time in the queue. At step 110, it is determined whether the amount of time that the next call has spent in the queue exceeds a service level time. In particular embodiments, a service level time may correspond to a particular time that an ACD has committed to or otherwise has as a goal for distributing a received call to an agent. If the amount of time that the next call has spent in the queue does not exceed the service level time, then the call may be distributed to the first agent at step 112.

However, if the amount of time that the next call has spent in the queue exceeds the service level time, then the method proceeds to step 114 where it is determined whether the call has been previously skipped a number of times equaling a skip limit for the ACD or the call. If the call has been skipped a skip limit number of times, then the method proceeds to step 116 where the call is distributed to the first agent. If the call, however, has not yet been skipped the skip limit number of times, then the call is skipped and the method proceeds to step 108 where the next call in the queue (e.g., the call that has waited the next-to-most amount of time) undergoes the same process. Particular embodiments may not include skip limit step 114. Some embodiments may instead or also look at a maximum time limit that calls may spend in the queue even if they would otherwise be skipped. Some embodiments may automatically distribute a call to the available agent if the call's wait time has reached a tolerance time range before projected abandonment.

Some of the steps illustrated in FIG. 3 may be combined, modified or deleted where appropriate, and additional steps may also be added to the flowchart. Additionally, steps may be performed in any suitable order without departing from the scope of the invention.

As indicated above, technical advantages of particular embodiments include systems and methods for distributing calls in a non-sequential manner from a queue that increases the service level that a call center or ACD can provide. In particular embodiments, a non-linear and non-sequential algorithm is used to reduce the number of calls that do not meet a target SLA without impacting overall system performance. Service levels may be improved without increasing the average queue time of all calls in queue or increasing the abandon level. Particular embodiments keep track of the number of times that a given call has been skipped over and prevents the situation of skipping over the first caller more than N times or if a "tolerance before abandon" time limit is reached. Particular embodiments keep track of the time that a given caller has already spent in queue and ensures that callers who have spent more than a pre-determined duration in the queue do not get skipped over. In some embodiments, the system may check the time a caller spent in queue against the "tolerance before abandon" time limit so abandon level is not impacted. Historical reporting may be provided that shows how many calls have been skipped over by other calls in the queue.

Although the present invention has been described in detail with reference to particular embodiments, it should be understood that various other changes, substitutions, and alterations may be made hereto without departing from the spirit and scope of the present invention. For example, although the present invention has been described with reference to a number of elements included within communication system 30 and ACD 34*a*, these elements may be combined, rearranged or positioned in order to accommodate particular routing architectures or needs. In addition, any of these elements may be provided as separate external components to communication system 30, ACD 34*a* or each other where appropriate. The present invention contemplates great flexibility in the arrangement of these elements as well as their internal components.

It should be understood that the architecture and functionality of ACDs and call centers described above is applicable generally to all call or contact centers that operate to answer incoming calls and identify appropriate agents to receive the calls. Accordingly, the described ACDs may include those call or contact centers that are located within an enterprise and are staffed by enterprise employees. ACDs implementing various functionality described herein are not intended to be limited to hosted and outsourced call or contact centers.

Numerous other changes, substitutions, variations, alterations and modifications may be ascertained by those skilled in the art and it is intended that the present invention encompass all such changes, substitutions, variations, alterations and modifications as falling within the spirit and scope of the appended claims.

What is claimed is:

1. A method for distributing calls, comprising:
   receiving a plurality of calls each for connection with one of a plurality of agents;
   storing each of the plurality of calls in a queue;
   monitoring the time that each of the plurality of calls has spent in the queue;
   determining that a first agent is available to receive a call;
   determining, for a first call that has spent the most time in the queue, a first amount of time that the first call has spent in the queue;
   determining whether the first amount of time has exceeded a service level time;
   if the first amount of time has not exceeded the service level time, distributing the first call to the first agent; and
   if the first amount of time has exceeded the service level time:
     maintaining the first call in the queue;
     determining, for a second call that has spent the second-most time in the queue, a second amount of time that the second call has spent in the queue;
     determining whether the second amount of time has exceeded a service level time; and
     if the second amount of time has not exceeded the service level time, distributing the second call to the first agent.

2. The method of claim 1, further comprising:
   determining whether the first amount of time has exceeded a limit time, the limit time comprising an amount of time above the service level time;
   if the first amount of time has exceeded the limit time, distributing the first call to the first agent; and
   if the first amount of time has not exceeded the limit time:
     determining, for a second call that has spent the second-most time in the queue, a second amount of time that the second call has spent in the queue;
     determining whether the second amount of time has exceeded a service level time; and
     if the second amount of time has not exceeded the service level time, distributing the second call to the first agent.

3. The method of claim 1, further comprising:
determining whether the first call has been skipped for distribution to an agent a skip limit number of times;
if the first call has been skipped for distribution to an agent the skip limit number of times, distributing the first call to the first agent; and
if the first call has not been skipped for distribution to an agent the skip limit number of times:
  determining, for a second call that has spent the second-most time in the queue, a second amount of time that the second call has spent in the queue;
  determining whether the second amount of time has exceeded a service level time; and
  if the second amount of time has not exceeded the service level time, distributing the second call to the first agent.

4. The method of claim 1, further comprising, if the second amount of time has exceeded the service level time:
determining, for a third call that has spent the third-most time in the queue, a third amount of time that the third call has spent in the queue;
determining whether the third amount of time has exceeded a service level time; and
if the third amount of time has not exceeded the service level time, distributing the third call to the first agent.

5. A method for distributing calls, comprising:
receiving a plurality of calls each for connection with one of a plurality of agents;
storing each of the plurality of calls in a queue;
monitoring the time that each of the plurality of calls has spent in the queue;
determining that a first agent is available to receive a call;
determining, for a first call that has spent the most time in the queue, a first amount of time that the first call has spent in the queue;
determining whether the first amount of time has exceeded a service level time;
if the first amount of time has not exceeded the service level time, distributing the first call to the first agent; and
if the first amount of time has exceeded the service level time:
  determining, for a second call that has spent the second-most time in the queue, a second amount of time that the second call has spent in the queue;
  determining whether the second amount of time has exceeded a service level time;
  if the second amount of time has not exceeded the service level time, determining a difference between the service level time and the second amount of time;
  determining a projected time in which a second agent will become available to receive a call;
  if the projected time is greater than the difference between the service level time and the second amount of time, distributing the second call to the first agent.

6. A system for distributing calls, comprising:
an interface operable to receive a plurality of calls each for connection with one of a plurality of agents;
a queue coupled to the interface and operable to store each of the plurality of calls; and
a processor coupled to the queue and operable to:
  monitor the time that each of the plurality of calls has spent in the queue;
  determine that a first agent is available to receive a call;
  determine, for a first call that has spent the most time in the queue, a first amount of time that the first call has spent in the queue;
  determine whether the first amount of time has exceeded a service level time;
  if the first amount of time has not exceeded the service level time, distribute the first call to the first agent; and
  if the first amount of time has exceeded the service level time:
    maintain the first call in the queue;
    determine, for a second call that has spent the second-most time in the queue, a second amount of time that the second call has spent in the queue;
    determine whether the second amount of time has exceeded a service level time; and
    if the second amount of time has not exceeded the service level time, distribute the second call to the first agent.

7. The system of claim 6, wherein the processor is further operable to:
determine whether the first amount of time has exceeded a limit time, the limit time comprising an amount of time above the service level time;
if the first amount of time has exceeded the limit time, distribute the first call to the first agent; and
if the first amount of time has not exceeded the limit time:
  determine, for a second call that has spent the second-most time in the queue, a second amount of time that the second call has spent in the queue;
  determine whether the second amount of time has exceeded a service level time; and
  if the second amount of time has not exceeded the service level time, distribute the second call to the first agent.

8. The system of claim 6, wherein the processor is further operable to:
determine whether the first call has been skipped for distribution to an agent a skip limit number of times;
if the first call has been skipped for distribution to an agent the skip limit number of times, distribute the first call to the first agent; and
if the first call has not been skipped for distribution to an agent the skip limit number of times:
  determine, for a second call that has spent the second-most time in the queue, a second amount of time that the second call has spent in the queue;
  determine whether the second amount of time has exceeded a service level time; and
  if the second amount of time has not exceeded the service level time, distribute the second call to the first agent.

9. The system of claim 6, wherein the processor is further operable to, if the second amount of time has exceeded the service level time:
determine, for a third call that has spent the third-most time in the queue, a third amount of time that the third call has spent in the queue;
determine whether the third amount of time has exceeded a service level time; and
if the third amount of time has not exceeded the service level time, distribute the third call to the first agent.

10. A system for distributing calls, comprising:
an interface operable to receive a plurality of calls each for connection with one of a plurality of agents;
a queue coupled to the interface and operable to store each of the plurality of calls; and
a processor coupled to the queue and operable to:
  monitor the time that each of the plurality of calls has spent in the queue;

determine that a first agent is available to receive a call;
determine, for a first call that has spent the most time in the queue, a first amount of time that the first call has spent in the queue;
determine whether the first amount of time has exceeded a service level time;
if the first amount of time has not exceeded the service level time, distribute the first call to the first agent; and
wherein the processor is further operable to, if the first amount of time has exceeded the service level time:
determine, for a second call that has spent the second-most time in the queue, a second amount of time that the second call has spent in the queue;
determine whether the second amount of time has exceeded a service level time;
if the second amount of time has not exceeded the service level time, determine a difference between the service level time and the second amount of time;
determine a projected time in which a second agent will become available to receive a call;
if the projected time is greater than the difference between the service level time and the second amount of time, distribute the second call to the first agent.

11. A system for distributing calls, comprising:
means for receiving a plurality of calls each for connection with one of a plurality of agents;
means for storing each of the plurality of calls in a queue;
means for monitoring the time that each of the plurality of calls has spent in the queue;
means for determining that a first agent is available to receive a call;
means for determining, for a first call that has spent the most time in the queue, a first amount of time that the first call has spent in the queue;
means for determining whether the first amount of time has exceeded a service level time;
means for, if the first amount of time has not exceeded the service level time, distributing the first call to the first agent; and
if the first amount of time has exceeded the service level time:
means for maintaining the first call in the queue;
means for determining, for a second call that has spent the second-most time in the queue, a second amount of time that the second call has spent in the queue;
means for determining whether the second amount of time has exceeded a service level time; and
if the second amount of time has not exceeded the service level time, means for distributing the second call to the first agent.

12. Logic embodied in a computer readable medium, the computer readable medium comprising code that, when executed by a processor, is operable to:
receive a plurality of calls each for connection with one of a plurality of agents;
store each of the plurality of calls in a queue;
monitor the time that each of the plurality of calls has spent in the queue;
determine that a first agent is available to receive a call;
determine, for a first call that has spent the most time in the queue, a first amount of time that the first call has spent in the queue;
determine whether the first amount of time has exceeded a service level time;
if the first amount of time has not exceeded the service level time, distribute the first call to the first agent; and
if the first amount of time has exceeded the service level time:
maintain the first call in the queue;
determine, for a second call that has spent the second-most time in the queue, a second amount of time that the second call has spent in the queue;
determine whether the second amount of time has exceeded a service level time; and
if the second amount of time has not exceeded the service level time, distribute the second call to the first agent.

13. The medium of claim 12, wherein the code is further operable to:
determine whether the first amount of time has exceeded a limit time, the limit time comprising an amount of time above the service level time;
if the first amount of time has exceeded the limit time, distribute the first call to the first agent; and
if the first amount of time has not exceeded the limit time:
determine, for a second call that has spent the second-most time in the queue, a second amount of time that the second call has spent in the queue;
determine whether the second amount of time has exceeded a service level time; and
if the second amount of time has not exceeded the service level time, distribute the second call to the first agent.

14. The medium of claim 12, wherein the code is further operable to:
determine whether the first call has been skipped for distribution to an agent a skip limit number of times;
if the first call has been skipped for distribution to an agent the skip limit number of times, distribute the first call to the first agent; and
if the first call has not been skipped for distribution to an agent the skip limit number of times:
determine, for a second call that has spent the second-most time in the queue, a second amount of time that the second call has spent in the queue;
determine whether the second amount of time has exceeded a service level time; and
if the second amount of time has not exceeded the service level time, distribute the second call to the first agent.

15. The medium of claim 12, wherein the code is further operable to, if the second amount of time has exceeded the service level time:
determine, for a third call that has spent the third-most time in the queue, a third amount of time that the third call has spent in the queue;
determine whether the third amount of time has exceeded a service level time; and
if the third amount of time has not exceeded the service level time, distribute the third call to the first agent.

16. Logic embodied in a computer readable medium, the computer readable medium comprising code that, when executed by a processor, is operable to:
receive a plurality of calls each for connection with one of a plurality of agents;
store each of the plurality of calls in a queue;
monitor the time that each of the plurality of calls has spent in the queue;
determine that a first agent is available to receive a call;
determine, for a first call that has spent the most time in the queue, a first amount of time that the first call has spent in the queue;

determine whether the first amount of time has exceeded a service level time;

if the first amount of time has not exceeded the service level time, distribute the first call to the first agent; and wherein the code is further operable to, if the first amount of time has exceeded the service level time:

determine, for a second call that has spent the second-most time in the queue, a second amount of time that the second call has spent in the queue;

determine whether the second amount of time has exceeded a service level time;

if the second amount of time has not exceeded the service level time, determine a difference between the service level time and the second amount of time;

determine a projected time in which a second agent will become available to receive a call;

if the projected time is greater than the difference between the service level time and the second amount of time, distribute the second call to the first agent.

* * * * *

UNITED STATES PATENT AND TRADEMARK OFFICE
CERTIFICATE OF CORRECTION

PATENT NO. : 7,630,487 B2
APPLICATION NO. : 11/114431
DATED : December 8, 2009
INVENTOR(S) : Shaffer et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1261 days.

Signed and Sealed this

Second Day of November, 2010

David J. Kappos
*Director of the United States Patent and Trademark Office*